Aug. 31, 1926.
O. F. LUNDELIUS
1,597,988
VEHICLE SPRING
Filed Dec. 3, 1923
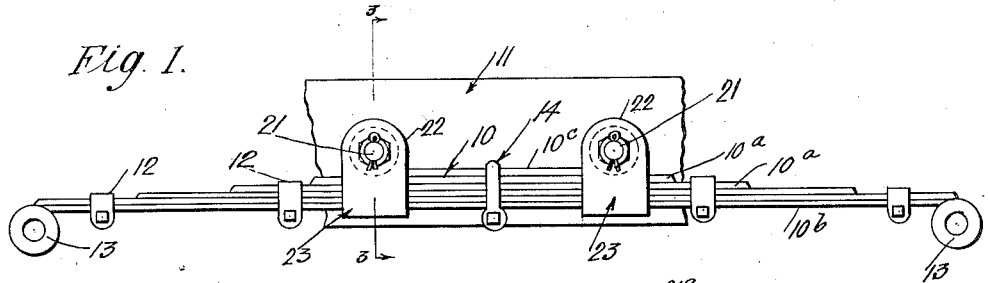
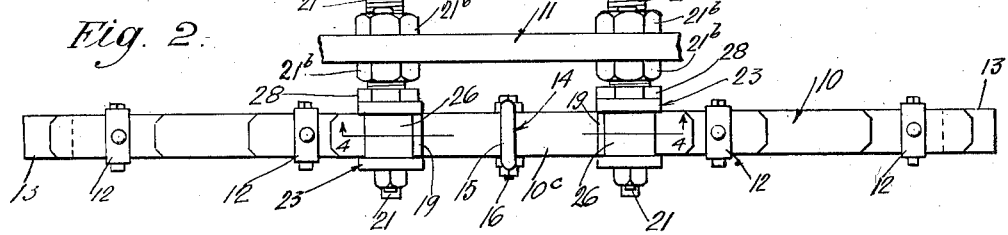
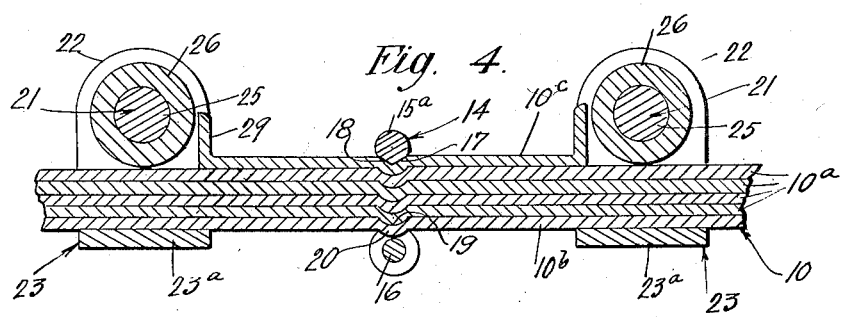
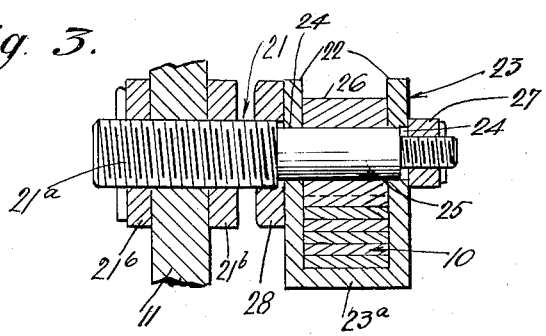
Inventor.
Oscar Frederick Lundelius
by
his Attorney.

Patented Aug. 31, 1926.

1,597,988

UNITED STATES PATENT OFFICE.

OSCAR FREDERICK LUNDELIUS, OF LOS ANGELES, CALIFORNIA, ASSIGNOR, BY DIRECT AND MESNE ASSIGNMENTS, TO LUNDELIUS & ECCLESTON MOTORS CORPORATION, OF LAS VEGAS, NEVADA, A CORPORATION OF DELAWARE.

VEHICLE SPRING.

Application filed December 3, 1923. Serial No. 678,150.

This invention relates to flat springs and especially to laminated leaf springs such as are used for suspending vehicle frames and bodies from traction wheels or runing gear. The invention is particularly concerned with a novel mounting for such springs.

While the springs and mountings of my invention may be used in many different situations, they may be applied with especially great advantage to the spring suspension of vehicles. Therefore I will hereinafter refer to an application of springs and mountings to this particular use, enabling me to more definitely describe structural features of, and point out benefits to be derived from a physical embodiment of the invention; but this choice of a specific embodiment for purposes of description, is not to be construed as a limitation on the invention.

In motor driven vehicles, the durability of power and power transmitting elements, efficiency in application of power, and comfort of passengers is dependent upon proper spring suspension means and spring action to a very considerable degree. To be efficient, the springs must have the combined qualities of strength adequate to withstand severe road conditions and to care for overloading, and must have sufficient resiliency and freedom of movement to effectively absorb road shocks and thereby relieve the vehicle proper from the effects of such shocks. In connection with the usual spring suspension means, the spring mountings or connections between the body of the spring and the supported structure (as distinguished from the usual pivotal connection between the spring ends and supported structure) is of a rigid nature, allowing no flexure or freedom of spring movement through points of spring support. This rigid type of connection also holds the several leaves of a laminated spring against relative longitudinal movement through points of support during spring flexure.

Thus when the spring is rigidly supported, the effective length thereof is reduced and the vibratory action of the spring impaired, so it will be seen the spring mounting has direct bearing on the action of the spring as a whole. Further, there is necessarily excessive strain and wear on the spring at its points of support, for during vehicle movement, the spring, immediately at one side of the support, is in almost constant movement, while at the other side of the support it is positively held against movement.

Therefore, it is the principal object of the invention to provide means for obtaining full spring flexibility and efficiency by overcoming the above objectionable features. This I accomplish by pivotally mounting the springs about their points of support, and allowing limited relative longitudinal movement between the springs and support. Further, in the case of a laminated leaf spring, while the several laminations are capable of relative longitudinal movement through the points of spring support, adjacent laminations, when flexed, are held in contact throughout their extent, as is necessary for equal distribution of strains.

Due to the unanchored nature of the connection between supports and springs, it is necessary to provide means for holding the springs and individual laminations against displacement from the support, and I accomplish this without impairing the flexibility of the spring through its point of support.

In the present application, I have illustrated but a single, straight spring unit, but it will be understood the invention may be applied equally well to semi-elliptic, full elliptic, scroll elliptic, and other types of springs.

My copending application on vehicle spring suspension, Serial No. 678,149, filed under even date herewith, wherein a plurality of springs is shown as cooperating to support a single structure, presents an example of the adaptability of my improved springs and mountings to serve a particular purpose in a certain situation, but the claims in the present application are drawn generally to the improved spring structure and mounting without regard to the particular nature of the supported structure.

A complete understanding of the invention will be had from the following detailed description, reference being had to the accompanying drawings, in which:

Figure 1 is a side elevation of my improved spring and mounting therefor.

Fig. 2 is a plan view of Figure 1.

Fig. 3 is a transverse vertical section on line 3—3 of Figure 1, and

Fig. 4 is a longitudinal vertical section on line 4—4 of Figure 2.

At the outset, I wish to state that while the drawings illustrate a laminated leaf spring having two points of pivotal connection with a supported structure, the invention may be embodied in a spring having but a single point of pivotal connection, or consisting of but a single flat leaf.

In the drawings, the numeral 10 designates generally a leaf spring, and 11 designates a structure supported thereby, say a vehicle frame member. Now, in certain types of vehicle suspension systems, the springs are directly supported by underlying wheel axles, the ends of the springs being shackled to the wheel frame; while in other systems (notably where cross springs are used) the spring ends are connected to axles or wheel supporting members, and the vehicle frames are supported by connection with the bodies of the springs. While the drawings illustrate a system of the latter type, member 11 may be considered either as a "supporting" or "supported" structure, for the spring mounting may be used similarly and to equal advantage in either situation.

Spring 10 is made up of the superimposed laminations or leaves 10ª, held in contact and vertical alinement by usual spring clips 12, which are of a nature to allow relative longitudinal movement between the leaves. The ends 13 of lowermost leaf 10ᵇ may be looped in the usual manner or provided with eyes for attachment to complementary springs or to structural elements to be sprung from member 11. Clamp 14, preferably arranged midway between ends 13, consists of U-bolt 15 which extends about three sides of the springs, and a cross or clamping bolt 16 which closes across the fourth side of the spring. The cross bar 15ª of U-bolt 15 has a wedge portion 17 (Figure 4) adapted to interfit with depression 18 in the topmost leaf 10ᶜ, and the remaining leaves have complementary projections and depressions 19 and 20, respectively, in vertical alinement with cross bar 15ª, so, by properly tightening clamp 14, the several laminations or leaves are held against longitudinal displacement with respect to each other.

Supporting members or studs 21 extend from frame member 11, being mounted thereon in any suitable manner, for instance, by providing a threaded extension 21ª through member 11, and threading clamping nuts 21ᵇ on the extension and against opposite sides of said member 11.

The arms 22 of U-shaped spring hangers 23 are apertured at 24 whereby they may be slipped over and have pivotal bearing on the reduced portions 25 of studs 21, the peripheral faces of the reduced portion preferably being ground to provide superior bearing faces. On stud portions 25 and between arms 22, are the removable cylindrical bushings 26. Hangers 23 are longitudinally positioned on the stud by nuts 27 threaded on the extremities of said studs, and nuts 28 on threaded extensions 21ª.

Spring 10 extends through and is embraced by the hangers in the manner clearly shown in Figures 3 and 4, the upper and lower leaves having face bearing with the peripheries of bushings 26 and on the lower cross member 23ª of the hangers, respectively. However, while adjacent leaves are held in contact between bushings 26 and cross members 23ª, said leaves are capable of free relative longitudinal movement between said bushings and members.

As means for limiting the longitudinal movement of the spring, or, expressed otherwise, for holding the upper leaf (and hence the rest of the leaves, by reason of clamp 14 and interfitting portions 19 and 20) against longitudinal displacement from or longitudinal separative movement with respect to the supporting members, the ends of the topmost leaf 10ᶜ are up-turned to provide stops 29 for engagement and coaction with the opposed faces of bushings 26. Preferably, stops 29 are equi-spaced from central depression 17, in which situation, it follows the studs and spring hangers are equi-spaced from the spring center.

From the above, it will be evident that during periods of spring flexure, hangers 23 are free to move pivotally about studs 21, and the spring leaves are free to flex and to have relative longitudinal movement through their points of support. Thus the spring has full flexibility, the connecting means between spring and frame having no cramping, binding or movement-checking effect on the spring, for the coacting means on spring and hangers for holding them against longitudinal displacement does not interfere with the spring movement in a manner to hamper spring flexure. The spring may be considered as floating about its support, but held against separative movement therefrom.

By adjustment of nuts 27 and 28 along the studs, arms 22 may be caused to grip bushing 26 with varying degrees of pressure, and depending upon the degree of pressure so applied, the bushings will either revolve with the hangers about the studs during spring flexure, or there will be relative rotary movement between bushings and hangers during such spring movement. Bushings 26, which may be readily replaced when worn excessively, also serve as spacers to prevent arms 22 being drawn together in a manner to bind the spring leaves.

While I have illustrated and described a preferred embodiment of my invention, I do not wish to be limited thereto, except for such limitation as a fair interpretation of the appended claims may import.

I claim:

1. The combination of a flat spring and means for connecting the spring to a structure, said means comprising axially parallel, spaced studs on the structure, spring hangers pivotally mounted on the studs and extending about three sides of the spring, and cylindrical bushings on the studs, said bushings having peripheral bearing against the fourth side of the spring and being adapted to hold the side of the spring opposite said fourth side in facial contact with the hangers.

2. The combination of a flat spring and means for connecting the spring to a structure, said means comprising axially parallel, spaced studs on the structure, spring hangers pivotally mounted on the studs and extending about three sides of the spring, bushings on the studs, said bushings having rolling bearing against the fourth side of the spring and being adapted to hold the side of the spring opposite said fourth side in facial contact with the hangers, the spring being capable of longitudinal movement through the hangers, and projections longitudinally spaced along the spring and adapted to coact with the bushings in a manner to limit such longitudinal movement of the spring.

3. The combination of a laminated flat spring and means for connecting the spring to a structure, said means comprising axially parallel, spaced studs on the structure, spring hangers pivotally mounted on the studs and extending across the face of one of the outside laminations and across the edges of all the laminations, cylindrical bushings on the studs, said bushings having peripheral bearing against the face of the other outside lamination and being adapted to hold said face of said one lamination in contact with the hangers, all the laminations being capable of longitudinal movement through the hanger; means adapted to limit longitudinal movement of one of said outside laminations through the hangers, and coacting means, independent of said first mentioned limiting means, on all the laminations adapted to limit relative longitudinal movement therebetween.

4. The combination of a flat spring and means for connecting the spring to a structure, said means comprising axially parallel, spaced studs on the structure, spring hangers pivotally mounted on the studs and extending about three sides of the spring, cylindrical bushings on the studs, said bushings having peripheral bearing against the fourth side of the spring and being adapted to hold the side of the spring opposite said fourth side in facial contact with the hangers, the spring being capable of longitudinal movement through the hangers, and means on the spring adapted to coact with the bushings in a manner to limit such longitudinal movement of the spring.

5. The combination of a laminated flat spring and means for connecting the spring to a structure, said means comprising axially parallel, spaced studs on the structure, spring hangers pivotally mounted on the studs and extending across the face of one of the outside laminations and across the edges of all the laminations, bushings on the studs, said bushings having rolling bearing against the face of the other outside lamination and being adapted to hold said face of said one lamination in contact with the hangers, all the laminations being capable of longitudinal movement through the hanger; means on one of the outside laminations adapted to coact with the bushings in a manner to limit longitudinal movement of said outside lamination through the hangers, and coacting means, independent of said first mentioned limiting means, on all the laminations adapted to limit relative longitudinal movement therebetween.

In witness that I claim the foregoing I have hereunto subscribed my name this 17th day of November, 1923.

OSCAR FREDERICK LUNDELIUS.